United States Patent [19]

Wortmann et al.

[11] 3,904,096
[45] Sept. 9, 1975

[54] DEVICE FOR BREAKING OFF OVERFLOW SHEETS

[75] Inventors: Ernst Wortmann; Heinz Krakow, both of Hamburg, Germany

[73] Assignee: Blohm & Voss AG, Germany

[22] Filed: Apr. 8, 1974

[21] Appl. No.: 459,214

[30] Foreign Application Priority Data
Apr. 9, 1973 Germany.......................... 2317810

[52] U.S. Cl. .................. 225/97; 225/96.5; 225/98
[51] Int. Cl.² ........................................ B65H 35/10
[58] Field of Search ............... 225/93, 96.5, 97, 98

[56] References Cited
UNITED STATES PATENTS
2,311,995  2/1943  Parker ............................. 225/98
3,268,135  8/1966  Barradell-Smith ............ 225/96.5 X
3,716,176  2/1973  Yamada et al ................... 225/96.5

Primary Examiner—J. M. Meister
Assistant Examiner—Fred A. Silverberg
Attorney, Agent, or Firm—Toren, McGeady and Stanger

[57] ABSTRACT

In a device for breaking off overflow sheets on the welded cross seams of plates or strips, a plurality of deflecting rollers are located laterally of the planar path of travel of the plates and in the path of the overflow sheets. The rollers are spaced apart in the direction of movement of the plates and the surfaces of successive rollers which contact the overflow sheets, are spaced at different dimensions from the planar path of travel of the plates so that the overflow plates are flexed through an angular range relative to the planar path of the plates for breaking off the overflow sheets.

9 Claims, 4 Drawing Figures

PATENTED SEP 9 1975    3,904,096

DEVICE FOR BREAKING OFF OVERFLOW SHEETS

SUMMARY OF THE INVENTION

The present invention is directed to a device for breaking off overflow sheets at the welded cross seams of plates or strips, particularly in machines for the production of helical seam pipes, and, more especially, the invention is directed to a device for flexing the overflow sheets to effect their removal from the plates or strips.

The overflow sheets serve to provide a starting or ending welding joint substantially equal to the intended welded cross section of the cross seam, particularly in machine welding, where the welding stations can be stationary or movable, that is, movable in synchronism with the rate of feed of the plate or strip entering the deformation station of the helical seam pipe plant. In the range of the overflow sheet, that is, in the immediate proximity of the starting welding joint, the arc is ignited and the welding apparatus is brought to the proper welding speed and to the rate of feed with which the electrode and the arc enter one end of the cross welded seam proper and issue at the other end. In the range of the other overflow sheet, that is, in the immediate proximity of the welded end joint, the welding speed and rate of feed of the welding apparatus are zero and the arc extinguishes. In general, two overflow sheets form between each other the welded cross seam with the desired configuration of the start and end of the cross welded joints. The overflow sheets can be secured to one another and/or on the plates or strips to be joined with each other by means of light tack welds.

Before mechanical working (trimming) of the plates or strips is possible, the overflow sheets must be removed following the completion of the welded cross seam. The manual removal of the overflow sheets, for example, by several hammer blows, is undesirable because it is very noisy and it is not shock-free. Moreover, such manual operations increase the work force necessary for producing the welded cross seams.

It is the primary object of the present invention to keep the time required for carrying out the entire welding operation as short as possible and to avoid, during the removal of the overflow sheets, the application of any shocks to the plates welded together which would have an adverse effect on the mechanical working of the edges of the plates and on the quality of the longitudinally extending welded seam on the helically welded pipe.

Therefore, in accordance with the present invention, a mechanical device is provided for breaking off the overflow sheets which avoids the problems experienced in the past and is particularly advantageous in the removal of relatively strong or thick overflow sheets.

In the mechanical device a stationary guideway is provided which extends perpendicularly to the cross seam and in substantially the same direction as the feed of the plate or strips. A number of serially arranged and spaced deflecting members are provided along the guideway for contacting the overflow sheets at different levels and for flexing the sheets through an angular range relative to the planar path travel of the welded plates through the guideway. The flexing action afforded by the deflecting members removes the overflow sheets from the welded plates.

With this device, the overflow sheets which are connected to the plates or the strips by the continuous cross weld, and also possibly by tack welding, are broken off automatically as the plates or strips are fed toward the deformation station of the helical seam pipe plant by the effect of the contact between the overflow sheets and the deflecting surfaces which lie in a curved path relative to the planar path of the plates. Due to the arrangement of the deflecting surfaces, the overflow sheets are bent or flexed through an angle of more than 60° about the longitudinal edge of the plates on one hand and, on the other hand, a rotary movement is provided about the axis of the welded cross seam. Both of these stressing actions result in the breakoff or removal of the overflow sheets without subjecting the plates to impact stresses.

In another feature of the invention, the deflecting surfaces which contact the overflow sheets can be located on the opposite sides of the planar path of movement of the plates so that the bending and turning action takes place about both sides of the planar path of travel.

If the deflecting surfaces are provided by a number of bending rollers or spaced in a series arrangement in the direction of the path of movement of the plates, the axes of the rollers which extend in the direction of the welded cross seam are located at different levels relative to the planar path of travel of the plates. In such an arrangement the resistance to the advance movement of the plate is reduced.

By inclining the axes of the bending rollers and their surfaces which contact the overflow sheets to correspond to the bending angle of the overflow sheet as it is flexed, the forces acting perpendicularly to the plane of the plates are reduced and the rollers absorbing the forces are relieved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
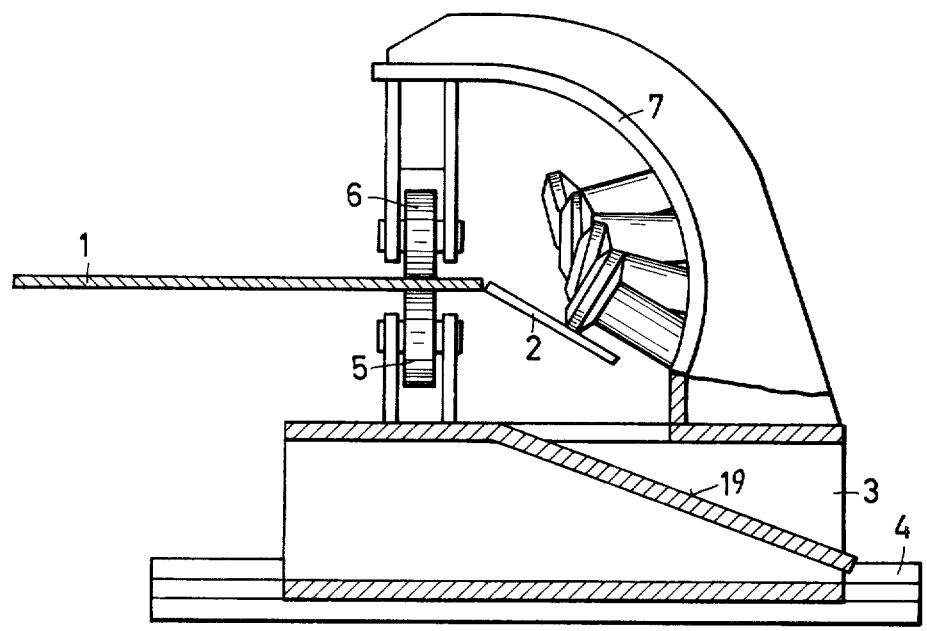
FIG. 1 is an elevational view, partly in section, of a device embodying the present inventions.
Figures 2, 3:
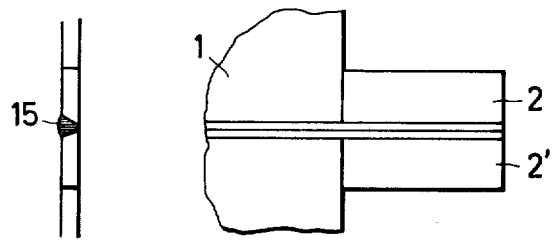
FIG. 2 is a top view of a plate or strip processed through the device in FIG. 1 in the range of a welded cross seam with overflow sheets attached.
FIG. 3 is a side view of the arrangement shown in FIG. 2.

In the drawing a device is shown through which plates or strips 1 with overflow sheets 2, 2' positioned at the location of cross welded seams between the plates, are passed for subsequent introduction into the deformation station in a plant for forming helically welded seam pipes. The device includes a support 3 displaceably mounted in rails 4 for movement perpendicular to the direction of movement or feed of the plates 1. The support 3 is displaceably mounted in rails 4 for movement perpendicular to the direction of movement or feed of the plates 1. The support 3 can be locked in position in the rails 4. Rollers 5 and 6 are mounted on the support 3 and support both sides of the plate 1 as it moves through the device. Either one or both of the rollers 5, 6 can be adjusted depending on the thickness of the plate.

Figure 4:
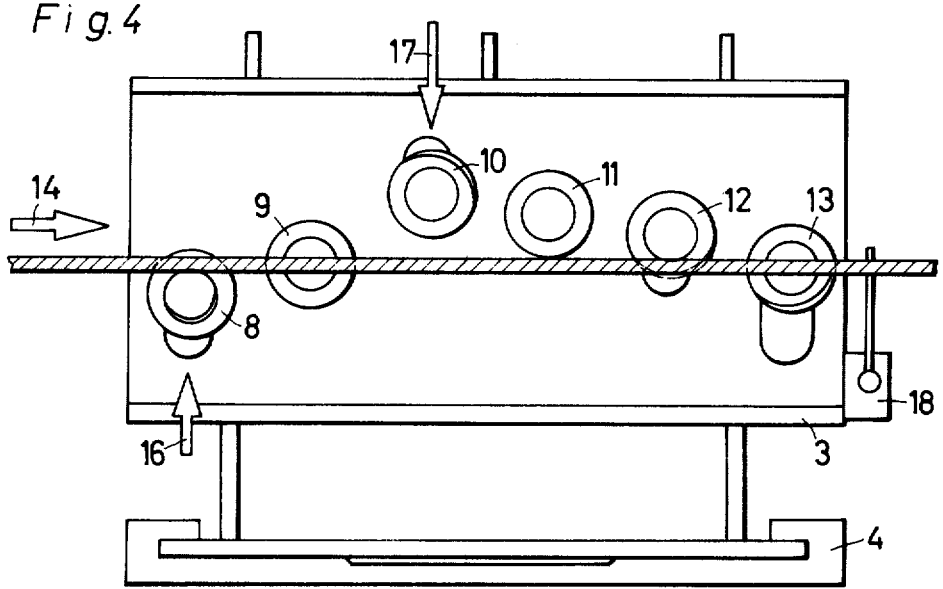
FIG. 4 is an elevational view of the device shown in FIG. 1, taken at right angles to the view in FIG. 1.

A curved support member 7 extends upwardly from the support 3 with its upper end cantilevered over one longitudinal edge of the plates 1. A plurality of bending rollers 8–13 are mounted on the curved support member 7. As can be noted in FIG. 4, the bending rollers 8–13 are spaced apart in the direction of the planar path of travel of the plates 1 through the device, note arrow 14, and the rollers are offset relative to one another in the direction of the path of travel of the plate. The center of the roller 8 is located below the path of travel of the plate, the center of roller 9 appears approximately at the same level as the path of travel of the plate, the next three rollers 10, 11 and 12 having their centers located above the path of travel of the plate, and the final roller 13 has its center at approximately the same level as the path of travel of the plate and of the center of roller 9. It can be noted in FIG. 1 that the bending rollers are located laterally offset from the longitudinal edge of the plates 1 and in line with the path of the overflow sheets 2, 2' as they pass through the device. The bending rollers 8-13 form a curved line of contact with the overflow sheets.

A discharge trough 19 is located in the support 3 for the removal of overflow sheets 2, 2' which are broken off from the plates 1.

During the operation of the plant for producing helically seam welded pipe, not illustrated, the plates 1 move along a planar path of travel as shown by the arrow 14. After the cross welding of successive plates is completed, the plates along with the overflow sheets 2, 2' joined to them by the welded seam 15 and possibly by tack welding, are bent or flexed as they contact the circumferential surfaces of the rollers. Initially, the overflow sheets contact roller 8 and are bent in the direction of arrow 16 as they pass over rollers 8 and 9.

After passing roller 9, the overflow sheets contact bending roller 10 and the bending action is reversed in the direction of arrow 17 with the successive rollers 11, 12 and 13 continuing to bend the overflow sheet in the direction of arrow 17 until it is broken off. A scanner 18 is provided at the downstream end of the device to check the removal of the overflow sheets from the plates.

While a specific embodiment of the invention has been shown and described in detail to illustrate the application of the inventive principles, it will be understood that the invention may be embodied otherwise without departing from such principles.

What is claimed is:

1. Device for breaking off overflow sheets from the welded cross seams of plates or strips, particularly for use in a machine employed in the production of helically welded seam pipes where the plates are fed in a first direction, comprising a guideway arranged to extend in the same direction as said first direction and extending transversely to the direction of the welded cross seam between plates, means associated with said guideway for supporting the plate so that the overflow sheets extend outwardly from said supporting means on one side thereof and the rest of the plate extends outwardly from said supporting means on the other side thereof as it passes along a planar path of travel therethrough, means supported by said guideway and located adjacent to said one side of said means for contacting said overflow sheets and for bending them in a first direction and a second direction opposite to said first direction and said supporting means for the plate comprising means for contacting the plate and for preventing any bending of the plates due to the bending of the overflow sheets.

2. The device according to claim 1, wherein said means supported by said guideway comprises a plurality of bending rollers, wherein at least one of said bending rollers has its longitudinal axis thereof extending at an angle relative to said direction of the welded cross seam of the plates, and at least one of said bending rollers has its longitudinal axis parallel to said direction of the welded cross seam.

3. Device, as set forth in claim 1, wherein said means for bending includes a plurality of overflow sheet deflecting members supported on and spaced apart on said guideway in the direction of the feed of the plate, the surfaces of adjacent said deflecting members being arranged to contact the overflow sheets in planes spaced from the planar path of travel of the plate and from one another.

4. Device, as set forth in claim 3, wherein at least one of the surfaces of said deflecting members arranged to contact the overflow sheets is located in a plane on the opposite side of the planar path of travel of the plate from the other planes of the surfaces of the other said deflecting members which are arranged to contact the overflow sheets.

5. Device, as set forth in claim 4, wherein said deflecting members comprise bending rollers spaced apart in the direction of the planar path of travel of the plates with the axes of said rollers being positioned at different spaced dimensions from the planar path of travel of the plates and the circumferential surfaces of said rollers defining the surfaces arranged to contact the overflow sheets.

6. Device, as set forth in claim 5, wherein said guideway includes rails extending transversely of the path of travel of the plate, a support displaceably mounted on said rails and securable in a stationary position therein, a curved sheet secured to and extending upwardly above said support so that it curves over the path of the longitudinal edges of the plates to which the overflow sheets are connected, and said deflecting rollers fixed to said curve sheet.

7. Device, as set forth in claim 6, wherein said support forms a discharge chute arranged to receive the overflow sheets after they are broken off from the plates.

8. The device according to claim 4, wherein said deflecting members comprise a plurality of bending rollers, at least one of said bending rollers arranged to contact the overflow sheets on said opposite side of the planar path of travel and having a longitudinal axis extending at a first angle relative to said direction of the welded cross seam, and at least one of said bending rollers arranged to contact the overflow sheets in said planes spaced from the planar path of travel and having a longitudinal axis thereof extending at a second angle to said direction of the welded seam of opposite sense to that of said first angle.

9. The device according to claim 8, wherein said plurality of bending rollers comprises at least one roller having a longitudinal axis thereof extending parallel to said direction of the welded cross seam.

* * * * *